United States Patent [19]

Hatwar et al.

[11] Patent Number: 5,563,000
[45] Date of Patent: *Oct. 8, 1996

[54] MULTILAYER MAGNETOOPTIC RECORDING MEDIA

[75] Inventors: Tukaram K. Hatwar, Penfield; Yuan-Sheng Tyan, Webster, both of N.Y.

[73] Assignee: Eastman Kodak Company, Rochester, N.Y.

[*] Notice: The term of this patent shall not extend beyond the expiration date of Pat. No. 5,407,755.

[21] Appl. No.: 316,743

[22] Filed: Oct. 3, 1994

Related U.S. Application Data

[63] Continuation-in-part of Ser. No. 212,601, Mar. 11, 1994, abandoned.

[51] Int. Cl.$^6$ .................................................. G11B 5/66
[52] U.S. Cl. ..................... 428/694 ML; 428/694 DE; 428/694 TM; 428/694 MT; 428/694 RL; 428/694 ST; 428/694 MM; 428/336; 428/611; 428/635; 428/668; 428/670; 428/900; 428/694 XS; 428/928; 428/699; 360/135; 369/13
[58] Field of Search .................................. 428/694 MM, 428/694 ML, 694 DE, 694 TM, 336, 900, 611, 635, 668, 670, 928, 699, 694 MT, 694 RL, 694 ST, 694 XS; 369/13; 360/135

[56] References Cited

U.S. PATENT DOCUMENTS

| 5,082,749 | 1/1992 | Carcia | 428/699 |
| 5,407,755 | 4/1995 | Brucker | 428/635 |

FOREIGN PATENT DOCUMENTS

| 0304927 | 3/1989 | European Pat. Off. . |
| 0304873 | 3/1989 | European Pat. Off. . |

OTHER PUBLICATIONS

P. Carcia, et al. "Dielectric Enhancement Layers for a Pt/Co Multilayer Magneto–Optical Recording Medium", Appl. Phys. Letter 58(2), Jan. 14, 1991, pp. 191–193.

Primary Examiner—Leszek Kiliman
Attorney, Agent, or Firm—Raymond L. Owens

[57] ABSTRACT

A magnetooptic medium which includes a substrate and a seed layer having at least two layers including a first layer of amorphous ZTO or ITO formed on the substrate and a metal layer formed on the first layer and a recording multilayer structure deposited on the seed layer.

7 Claims, 9 Drawing Sheets

MULTILAYER MAGNETOOPTIC RECORDING MEDIA

CROSS REFERENCE TO RELATED APPLICATIONS

This application is a continuation-in-part of commonly assigned U.S. patent application No. 08/212,601 filed Mar. 11, 1994, entitled "Multilayer Magnetooptic Recording Media" to Tukaram K. Hatwar and Yuan-Sheng Tyan, now abandoned.

Reference is made to commonly assigned U.S. patent application Ser. No. 076,604 to Tukaram K. Hatwar, Yuan-Sheng Tyan, Anthony C. Palumbo, and Charles F. Brucker, filed Jun. 14, 1993 and U.S. Pat. No. 5,407,755 to Charles F. Brucker, Tukaram K. Hatwar, and Yuan-Sheng Tyan, filed Jun. 14, 1993, the disclosures of which are incorporated by reference herein.

FIELD OF THE INVENTION

This invention relates to magnetooptical (MO) recording media having a platinum/cobalt (Pt/Co) or palladium/cobalt (Pd/Co) multilayered structure.

BACKGROUND OF THE INVENTION

Pt/Co multilayers have been used for MO recording media. These materials have perpendicular magnetic anisotropy, large Kerr rotation at short wavelength and excellent environmental stability. However, these materials when deposited by conventional sputtering processes possess low coercivity. Attempts have been made to increase the coercivity by controlling the Co/Pt ratio, using seed layers of metals and dielectrics, and etching the substrate before depositing the multilayer (see Magnetooptic Recording Medium, European Patent Application 0304873 (1988)); Perpendicular Magnetic Recording Media, European Patent Application 0304927 (1989); U.S. Pat. No. 5,082,749; and "Dielectric Enhancement Layers for a Co/Pt Multilayer Magnetooptic Recording Medium", Carcia et al, Appl. Phys Lett. 58 (1991), pages 191–193. For high Co/Pt ratio, even though coercivity up to 1000 Oe can be obtained, the hysteresis loops are not square. For through substrate recording, the use of a metal seed layer is objectionable since it attenuates the Kerr rotation, decreases the figure of merit and decreases the recording sensitivity. Some of the dielectrics such as oxides and nitrides of Zn, In, Al, Ta, Mg, Si, Sn, Fe, Zr, Bi metals increase the coercivity but the thickness of these layers is usually recommended to be more than 100 nm for sufficient enhancement. This also increases the deposition time and lowers the production throughput. Further, the crystalline size of the material is directly proportional to the thickness of the layer. Large crystalline size in thick seed layers may give rise to the noise during the recording process.

Furthermore, most oxides and nitrides are difficult to deposit using simple non-reactive dc sputtering at high deposition rate. The low deposition rate and the large structure thickness require long deposition time, result in low production throughput, induce thermal damage to the sensitive substrate such as PC and gives rise to mechanical stresses causing deformation of the structure. In extreme cases cracking and delamination of the structure may occur.

In the above-identified U.S. patent application Ser. Nos. 076,604, an amorphous seed layer is used which has a thickness of less than 20 nm. In U.S. Pat. No. 5,407,755 a polycrystalline seed layer is disclosed. Both of these seed layer structures provide a number of advantages.

SUMMARY OF THE INVENTION

It is therefore an object of the present invention to provide an improved magneto optic media structure having a Co/Pt multilayer but with increased coercivity and squareness and manufacturing throughput.

The above object is achieved by a magnetooptical recording medium comprising a substrate, a seed layer structure having at least two layers including a first layer formed on the substrate and made of amorphous indium tin oxide (ITO) or zinc tin oxide (ZTO) and having a thickness of 0.2–20 nm; and a metal layer formed directly on the first layer having a thickness of 0.2–3.2 nm and a recording multilayer of alternate layers of platinum and cobalt or palladium and cobalt alloy deposited onto the said seed layer structure, wherein the said seed layer structure is selected to improve the coercivity and squareness of the recording multilayer.

The following are advantages of magnetooptic media made in accordance with this invention:

a) these seed layers enhance the coercivity and squareness of the Kerr hysteresis loop;

b) these seed layers reduce the writing noise, increase the carrier and hence the general performance of the MO structure;

c) the thinness of the layers allows less deposition time; this reduces the thermal damage to the sensitive substrate and the mechanical stresses of the structure;

d) the small thickness of the seed layers permits an improved production throughput during manufacturing;

e) the duplex seed layer provides increased perpendicular anisotropy and coercivity of the Co/Pt superlattice;

f) when incorporated into a disk, the present invention provides increased in-track uniformity;

g) a duplex layer functions better than a single layer of ITO, ZTO or Pt metal; and h) magnetooptic structures made in accordance with this invention are particularly suitable for applications using short wavelength lasers.

DETAILED DESCRIPTION OF THE INVENTION

Figure 1A:
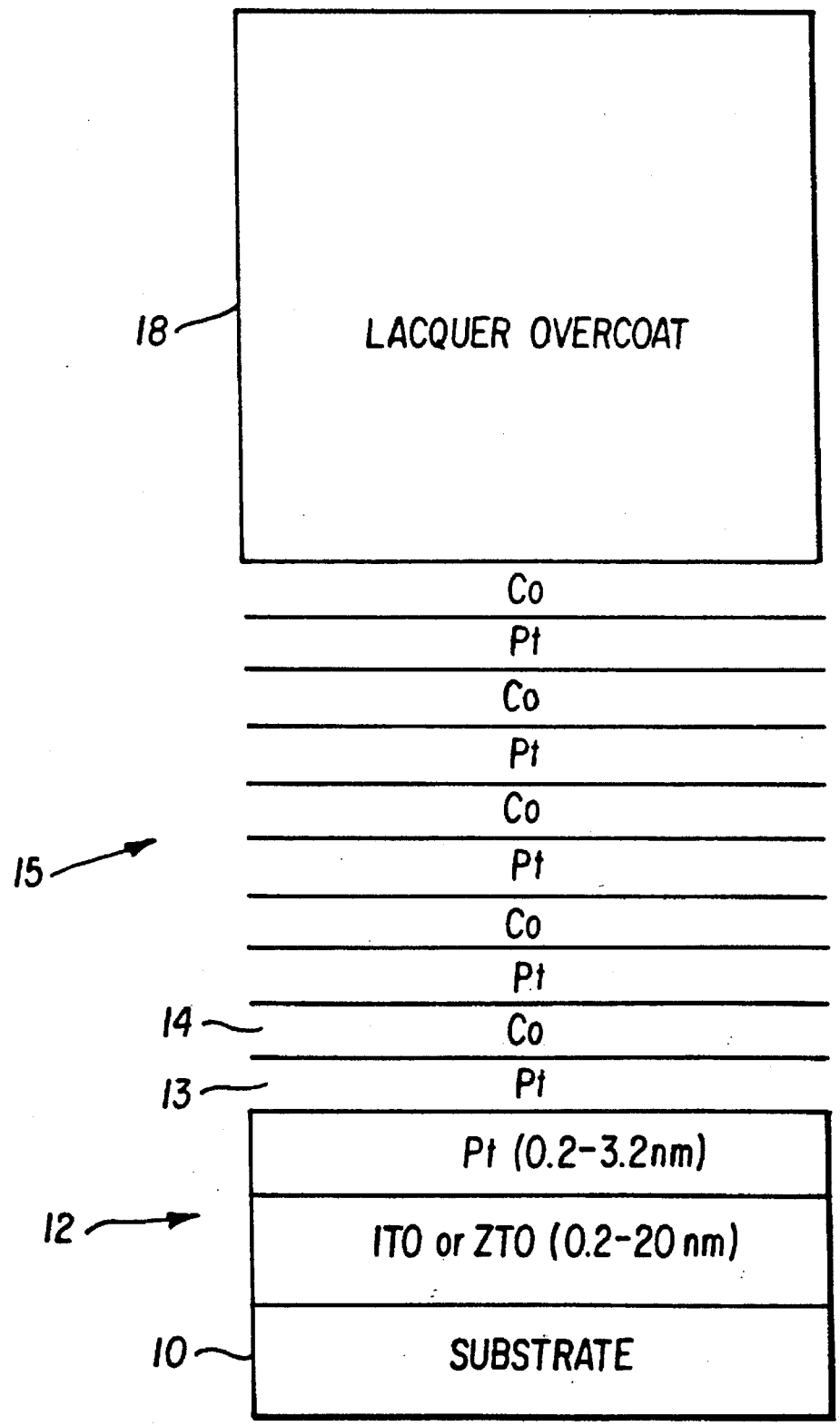
FIGS. 1A and 1B show different magnetic recording structures including a seed layer in accordance with the invention.

Turning first to FIG. 1A, a schematic shows a structure in accordance with the invention. The device includes a substrate 10 which is made, for example, of polycarbonate or glass and a duplex seed layer 12 made of ITO or ZTO in the bottom layer and a metal in the layer. It will be understood that this seed layer can have various combinations of materials as will be described hereinafter and still operate in accordance with the invention. On the duplex seed layer 12 is deposited a multilayer recording element 15 having alternating bilayers of Pt (13) and Co (14). It has been found to be preferable to start with a Pt layer 13 on the duplex seed layer 12. In FIG. 1A, the metal layer of the duplex seed layer is Pt and the first alternate layer of the multilayer recording element 15 is also Pt. Generally the substrate is transparent as light from a laser or other source will illuminate a recording multilayer structure through the substrate. The Pt layers typically having a range of from 0.4–2 nm and the Co layers have a thickness of 0.2–0.8 nm.

Figure 1B:
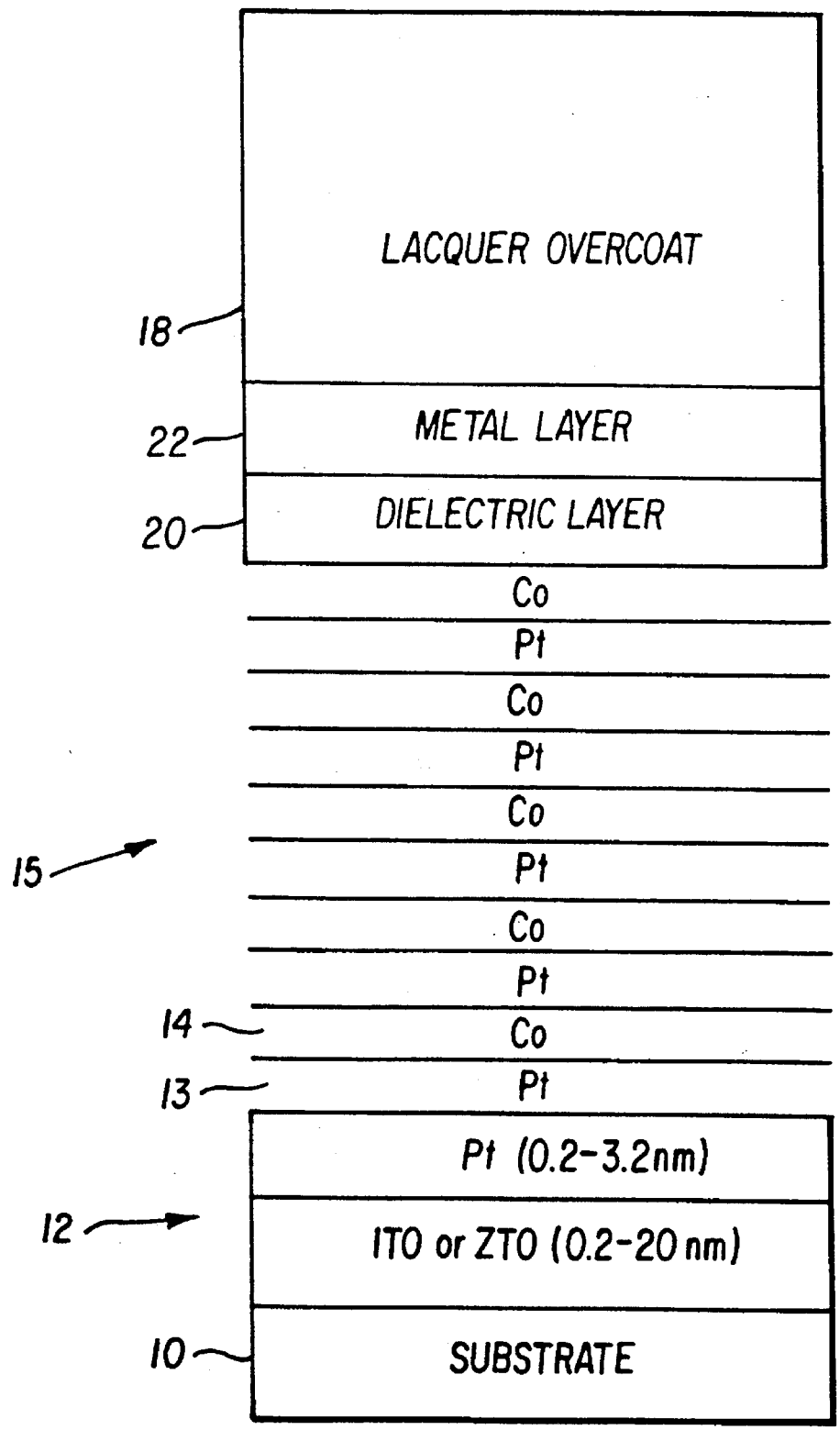

In FIG. 1B, a different structure is shown but, where layers correspond to those in FIG. 1A, the same numbers will be used. This structure is different from FIG. 1A in that there is a dielectric layer 20 formed directly on the multilayer recording element 15. A metal layer 22 is formed, for example, of a reflective material such as of aluminum, gold, silver, copper or platinum can be disposed directly on the dielectric layer 20. The lacquer overcoat layer 18 is formed on the metal layer 22.

Preferably, a UV curable lacquer overcoat layer 18 is provided over the recording multilayer. This lacquer overcoat layer 18 is scratch resistant and maintains structural integrity of the media. Alternatively, a double-sided construction can be utilized wherein two substrates coated with seed layers and the platinum/cobalt multilayers are laminated together using adhesives. Yet another alternative is to form an air-sandwich structure while a small air gap is maintained between them. Also, a dielectric layer can be provided directly on the multilayer recording. This layer may be selected to be the same material as the seed layer or some other material. Its function is to thermally insulate the lacquer layer from the recording multilayer. It also can be selected to provide an optical enhancement function if the media is illuminated by light passing through it (front surface recording). These structures are particularly suitable for use in magnetooptic disk, compact disk (CD) and photo compact disk (Photo CD). Alternatively, a blank disk can be used in an air-sandwich structure with a magnetooptical recording medium in accordance with the invention. Magnetooptical recording medium structures in accordance with this invention can be provided in the form of a disk which can be used in a cartridge.

With this type of structure, incident laser light illuminates a particular portion of the substrate, passes through the substrate, and interacts with the multilayered structure changing the Kerr rotation.

MAKING MO STRUCTURES

Thin layer structures of ITO and ZTO were prepared by d.c. sputtering a homogenous electrically conducting targets in Ar, Kr, Ar+$O_2$ or Kr+$O_2$ atmosphere. When the thickness is less than 100 nm, the ITO or ZTO seed layers are optically transparent in the 300–900 nm wavelength region.

Amorphous zinc-tin-oxide films were prepared in the following manner: Thin films of ZnSnO were prepared by d.c. sputtering a homogeneous electrically conducting target in Ar (or Kr) and Ar+1%$O_2$ (or Kr+1%$O_2$) atmosphere. Targets of varying amounts of ZnO and $SnO_2$ prepared by hot-press method were used to obtain structures of various ZTO compositions. Structures were deposited on glass and Si substrates. When these thicknesses are less than 100 nm, structures were optically transparent in the 300–9000 nm wavelength region.

Figure 2A:
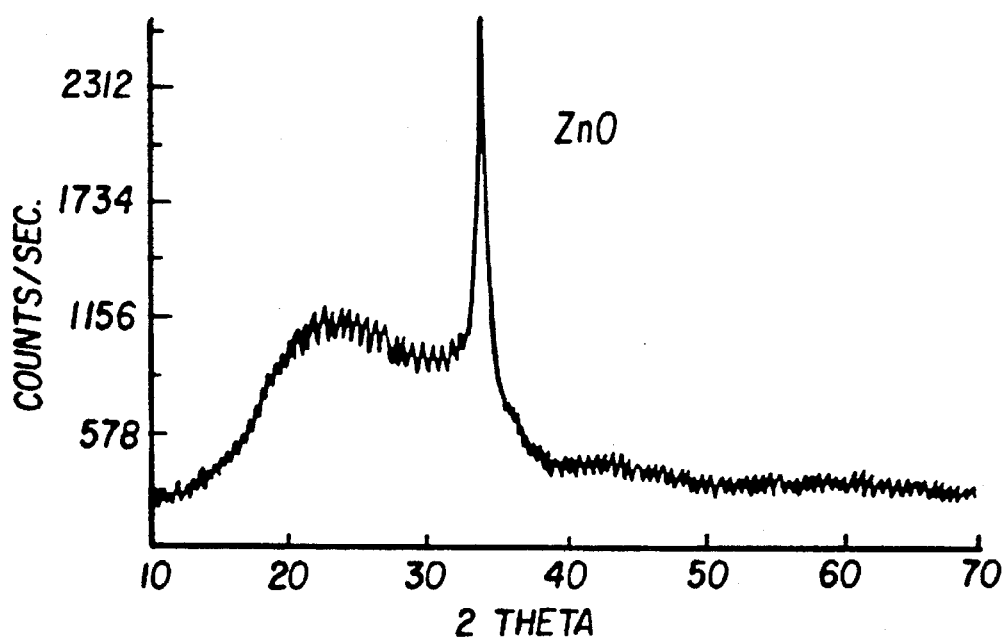
FIGS. 2A–D show a series of x-ray diffraction patterns of zinc oxide and zinc-tin-oxide with different percentages of tin oxide.
Figure 2B:
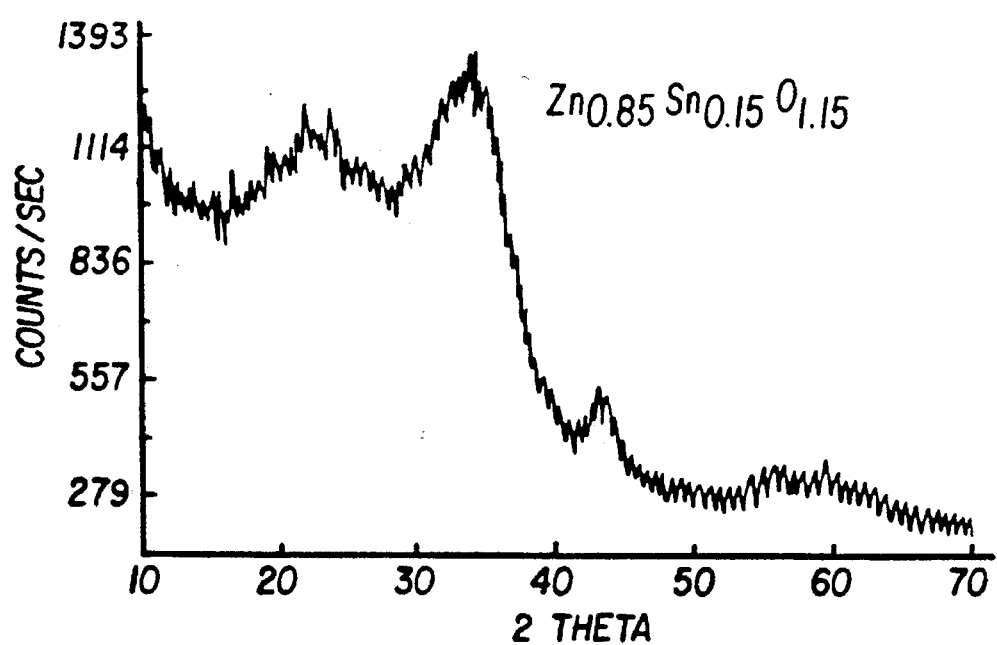
Figure 2C:
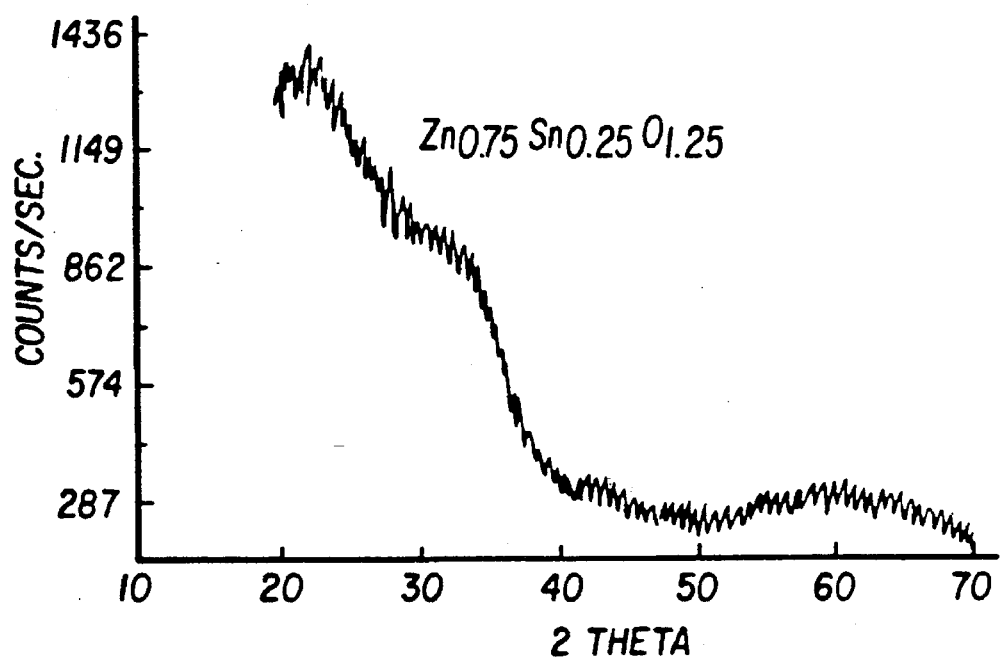
Figure 2D:
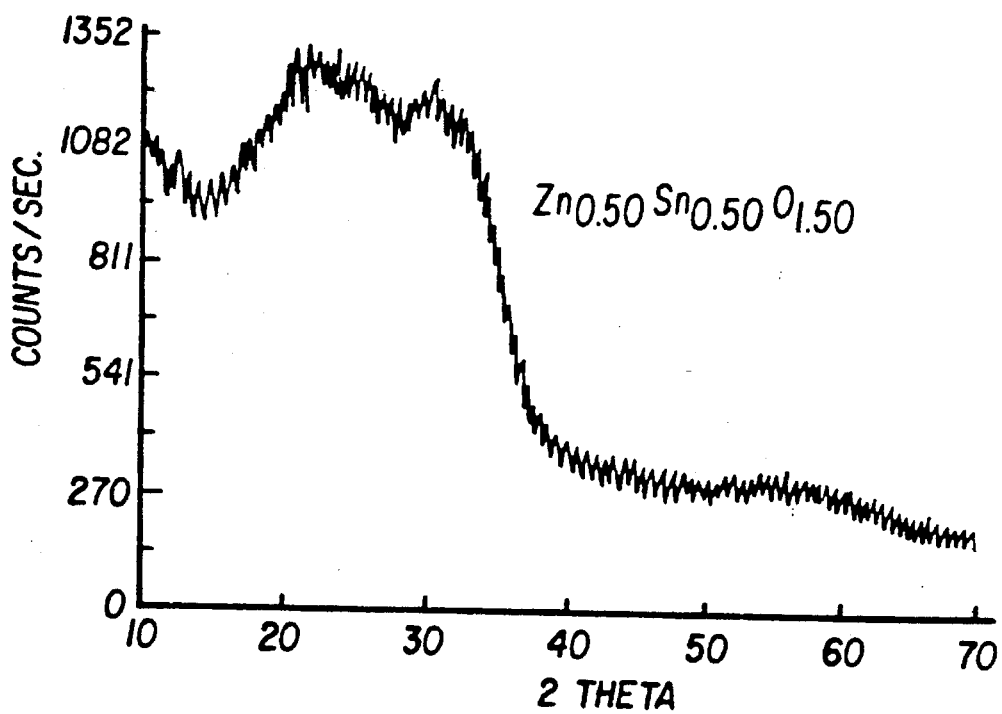

The crystallinity of $Zn_{1-x}Sn_xO_{1+x}$ wherein x=0, 0.15, 0.25, 0.50 structures was analyzed by x-ray diffraction technique and found to vary with the chemical composition of the film. As shown in FIG. 2A, ZnO alone is highly crystalline. A strong x-ray diffraction peak at angle $2\phi=34$ degrees corresponds to (002) ZnO peak and has a d-spacing of 0.266 nm. The crystalline size of the ZnO film was found to be 14 nm. FIGS. 2A, 2B and 2C show the x-ray diffraction patterns of ZnSnO films of various compositions. The $Zn_{0.85}Sn_{0.15}O_{1.15}$ film containing 15% Sn indicates an x-ray diffraction peak centered around $2\phi=25$ degrees as shown in FIG. 2B indicating that the film is still crystalline. X-ray diffraction patterns shown in FIGS. 2C and 2D of the films $Zn_{0.75}Sn_{.25}O_{1.25}$ and $Zn_{.50}Sn_{.50}O_{1.50}$ do not indicate any diffraction peaks and are amorphous in structures. A wide band centered around angle $2\phi=25$ degrees corresponds to the glass substrate.

Thin structures of $In_2O_3$, $SnO_2$ and indium-tin oxide (ITO) were prepared by d.c. sputtering a homogenous target in Ar (or Kr) and Ar+1%$O_2$ (or Kr+1%$O_2$) atmosphere. Targets of varying amounts of $In_2O_3$ and $SnO_2$ prepared by hot-press method were used to obtain structures of various ITO compositions. Structures were deposited on glass and Si substrates. These structures were opticaly transparent in the 300–900 nm wavelength region, have high index of refraction and low extinction coefficient. The refractive index, n increased monotonically from 2.26 at 820 nm to 2.44 at 420 nm, while the absorption coefficient, k was smaller than 0.05.

The crystallinity of $(In_2O_3)1-x$ $(SnO_2)x$ (x=0, 0.1, 0.25, 0.5, 0.75 and 1.0) structures was analyzed by x-ray diffraction and found to vary with the sputtering gas used and the deposition conditions. $In_2O_3$ structure was found to be crystalline whereas $SnO_2$ structure was amorphous irrespective of the sputter gas used. $(In_2SO_3)90(SnO_2)$ 10 structure is crystalline.

The Pt/CO multilayers were prepared by d.c. sputtering Pt and Co targets in Ar, Kr or Xe atmosphere. The base pressure before depositing the structures was about $1.2\times10^{-6}$ Torr and deposition pressure was about 5–20 mT. Alternate layers of Pt and Co were deposited onto the substrate spinning over the Pt and Co targets. The thickness of each layer was controlled by controlling the deposition rate and the substrate rotation speed.

A Pt/Co multilayer structure with twelve bilayers was deposited on a 5.25" dia. glass substrate. The thickness of the individual Pt and Co layers were 0.25 nm and 0.8 nm respectively.

Figure 3:
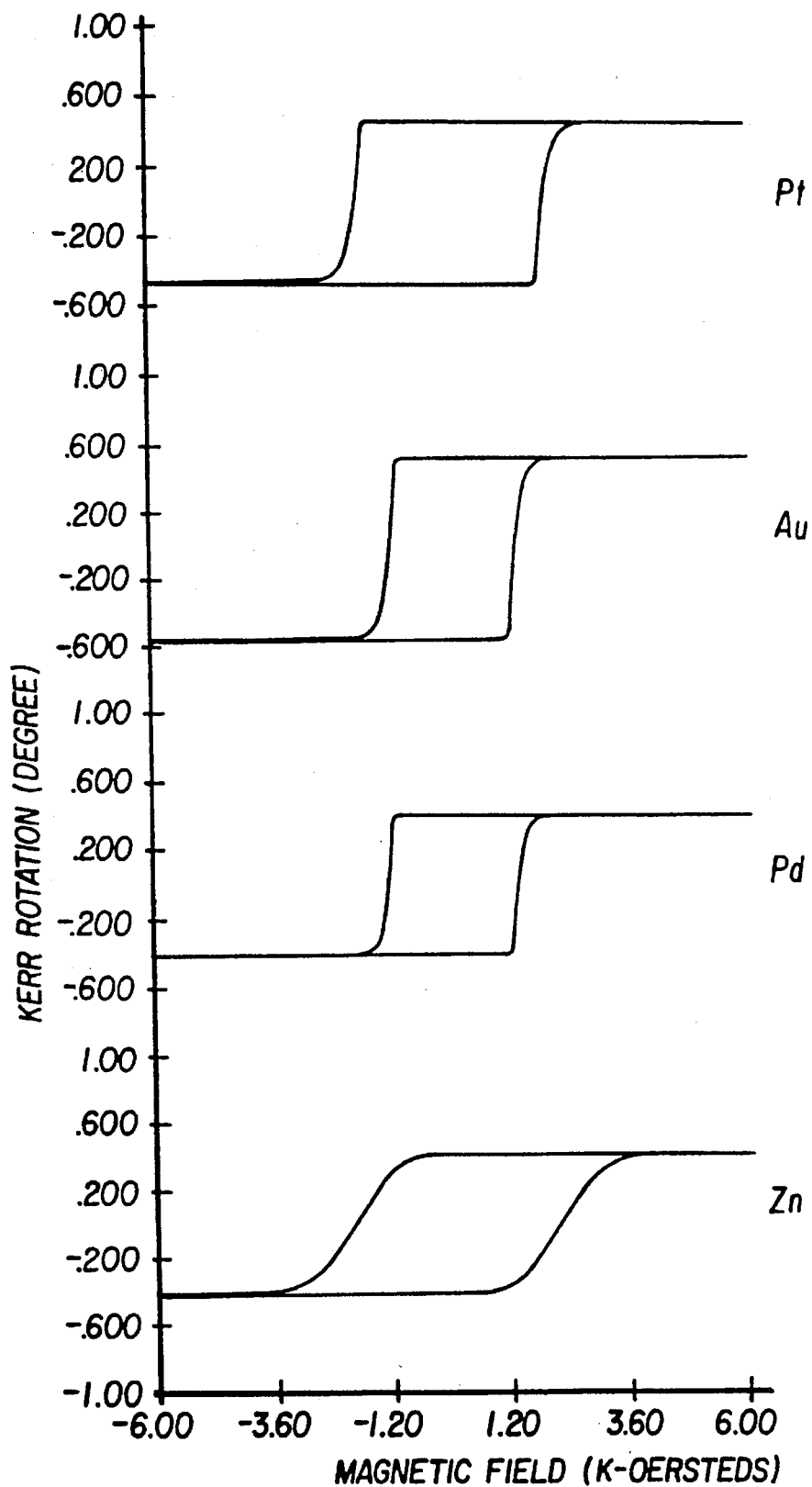
FIG. 3 shows a series of plots of Kerr hysteresis loops for different duplex seed layer structures, having the bottom layer made of ZTO and the layer of Pt, Au, Pd and Zn with the same thickness.

Turning now to FIG. 3, we see the Kerr hysteresis loops of a Pt/Co multilayer using a duplex seed layer. The bottom layer of the duplex seed layer is provided by amorphous ZTO and the layer is a metal layer with the metal being selected from the group consisting of Pt, Au, Pd, and Zn. The thicknesses of the ZTO and the metal layers were 1 nm and 1.6 nm, respectively. In this arrangement, there were 12 bilayers of Co at 0.35 nm each and Pt at 0.8 nm. As shown, using Pt as the metal layer, the Kerr hysteresis loop was quite square and had a large coercivity. The other metals also exhibited square coercivities except that zinc had a large coercivity, but not as square a hysteresis loop. Other metals, such as Ir, Co, Ag, Bi, Sb, and Pb, were tested but performed less satisfactorily.

Figure 4:
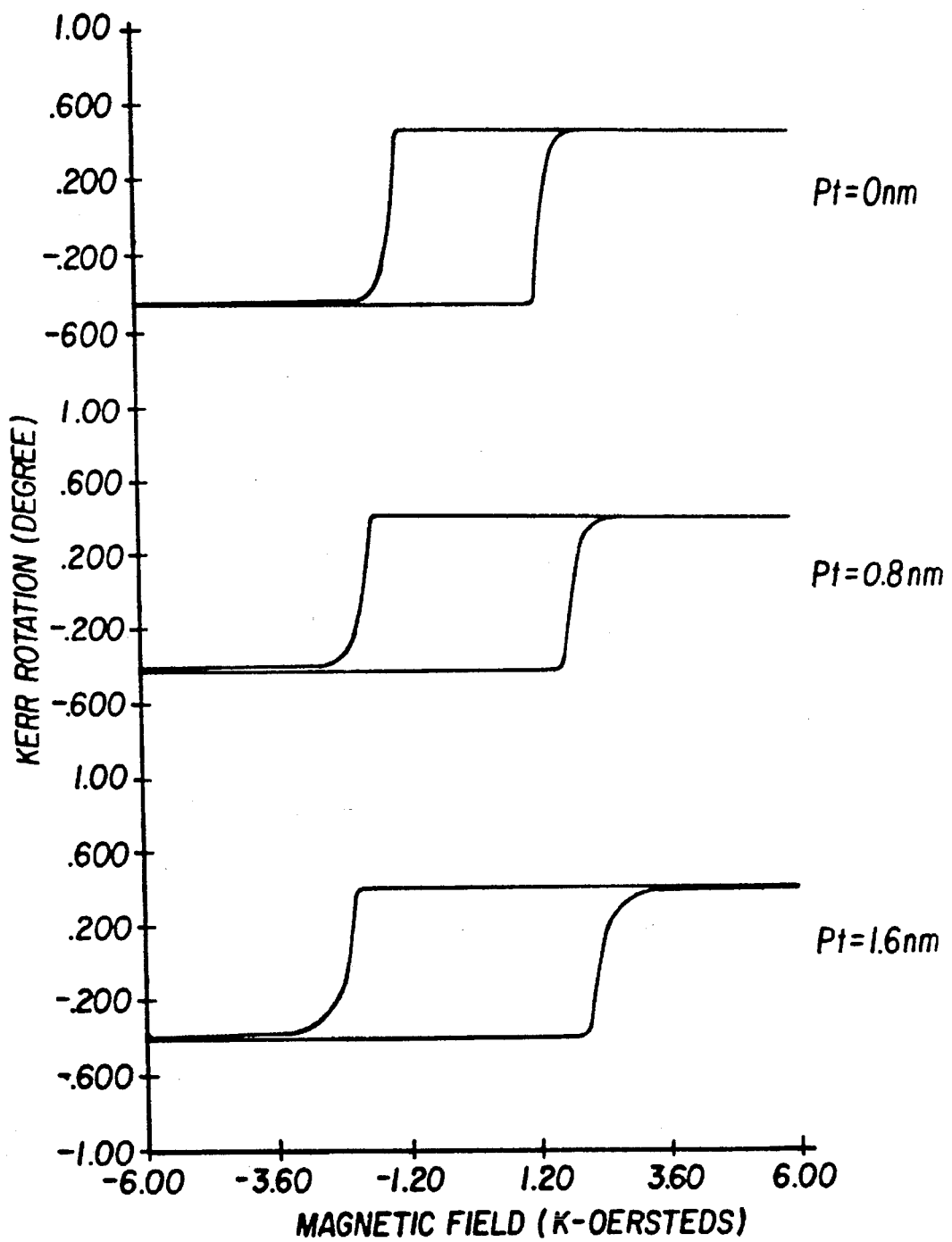
FIG. 4 shows a series of plots of Kerr hysteresis loops for different duplex seed layer structures, having a bottom layer of ZTO and a layer of different Pt thicknesses.

Turning now to FIG. 4, we see Kerr loops of a Pt/Co multilayer using a duplex seed layer which have a ZTO bottom layer of 1 nm and various thicknesses of Pt in the metal layer. The multilayer recording element is the same as in FIG. 5. As shown with increasing thickness of Pt, the coercivity increases, but the Kerr rotation decreases.

Figure 5:
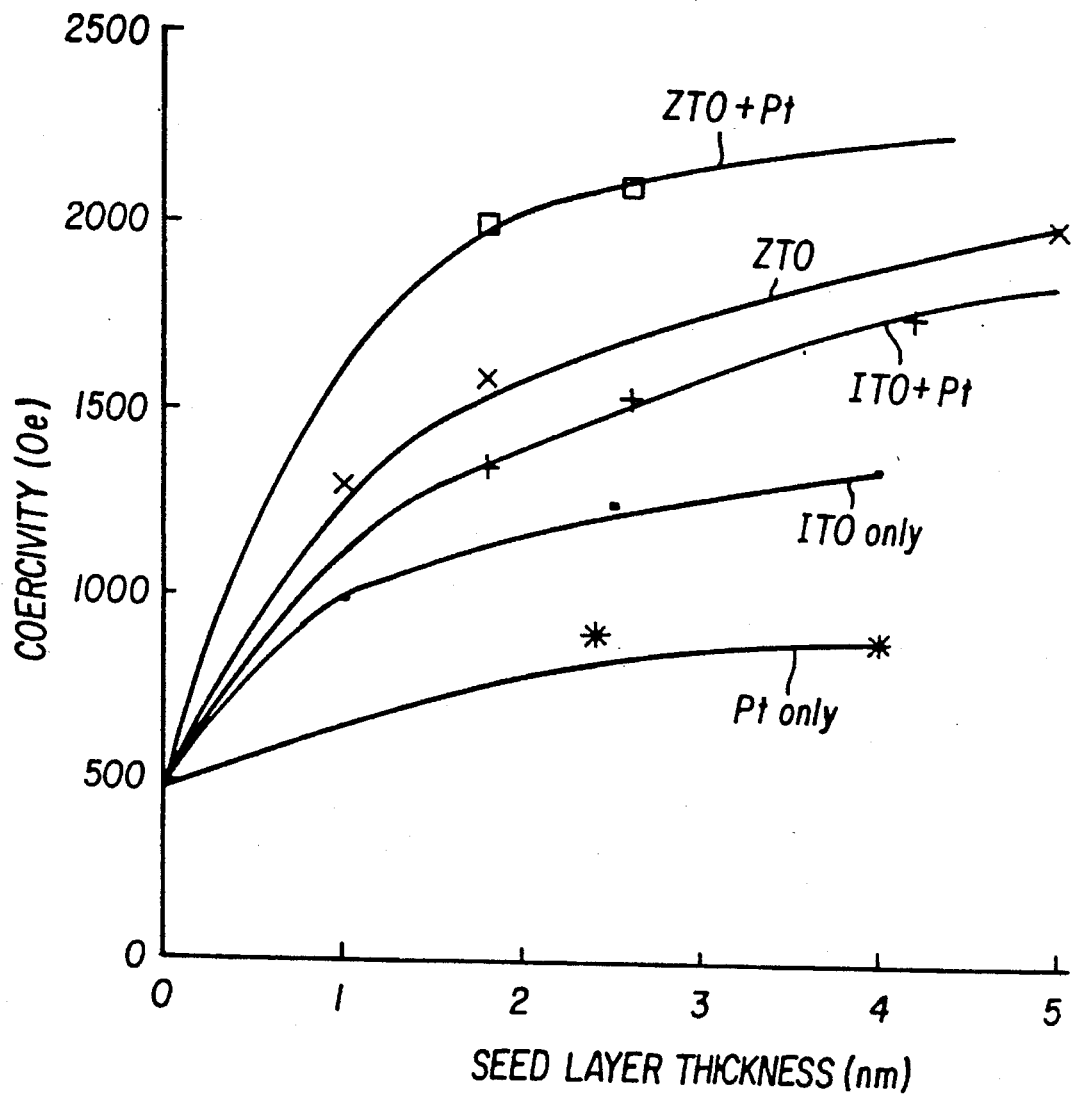
FIG. 5 shows a plot comparing coercivity of different seed layer structures.
Figure 6:
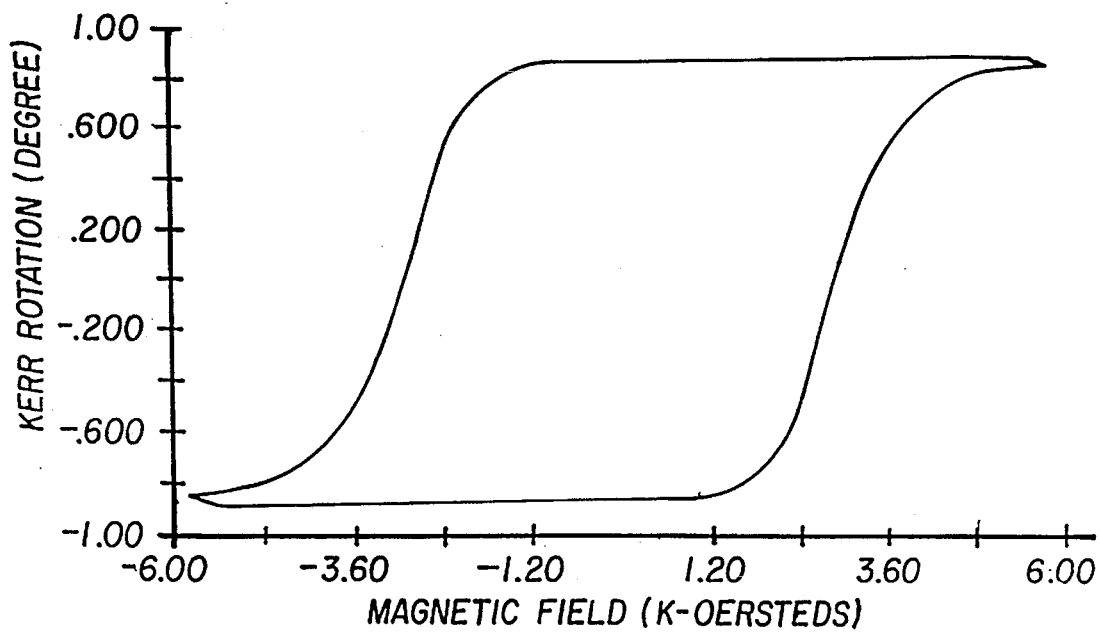
FIG. 6 shows a Kerr hysteresis loop using crystalline zinc oxide seed layer for a first disk used in the comparison example.

Turning now to FIG. 5, we see various plots of coercivity versus thicknesses of the seed layer. The bottom layer is either ITO or ZTO. Plots are shown for the bottom layer of ITO with a layer of Pt and for ZTO with a layer of Pt. Also, seed layers with ZTO alone, ITO alone, and Pt alone are also plotted. As shown in this arrangement, duplex seed layers of ZTO with Pt and ITO with Pt are quite effective and show advantageous results.

COMPARATIVE EXAMPLE

Garcia in U.S. Pat. No. 5,082,749 (see also Dielectric Enhancement Layers for a Pt/Co Multilayer Magneto-Optical Recording Medium, Carcia et al, 191, Appl. Phys. Lett. 58 (2) 1991, pages 191–193) uses c-axis oriented crystalline seed layers (see Carcia U.S. Pat. No. 5,082,749, column 5, lines 56–57). Carcia discussed the use of ZnO, AlN, SnO2 and ITO but he also indicated that the amorphous material will not work. Carcia has described that because ZnO is crystalline, Zn and O atoms in the hexagonal planes of ZnO closely line up with Pt atoms of the close packed (111) fcc planes of the Co/Pt multilayer structure. This clearly means that only crystalline material will give seeding effect for the coercivity enhancement and amorphous material (where crystallinity is absent) will not give seeding effect. Thus crystalline materials will behave differently than the amorphous layers.

FIGS. 6–9 show comparative data for two disks using crystalline ZnO and amorphous $Zn_{.5}Sn_{.5}O_{1.5}$ seed layers.

The first disk uses 80 nm crystalline ZnO seed layer. It has large coercivity equal to 2917 Oe as envisioned by Carcia but also large slantness of the Kerr hysterisis loop (see FIG. 6). This Kerr hysterisis loop is similar to that of Carcia (Carcia U.S. Pat. No. 5,082,749, FIG. 2).

Figure 7:
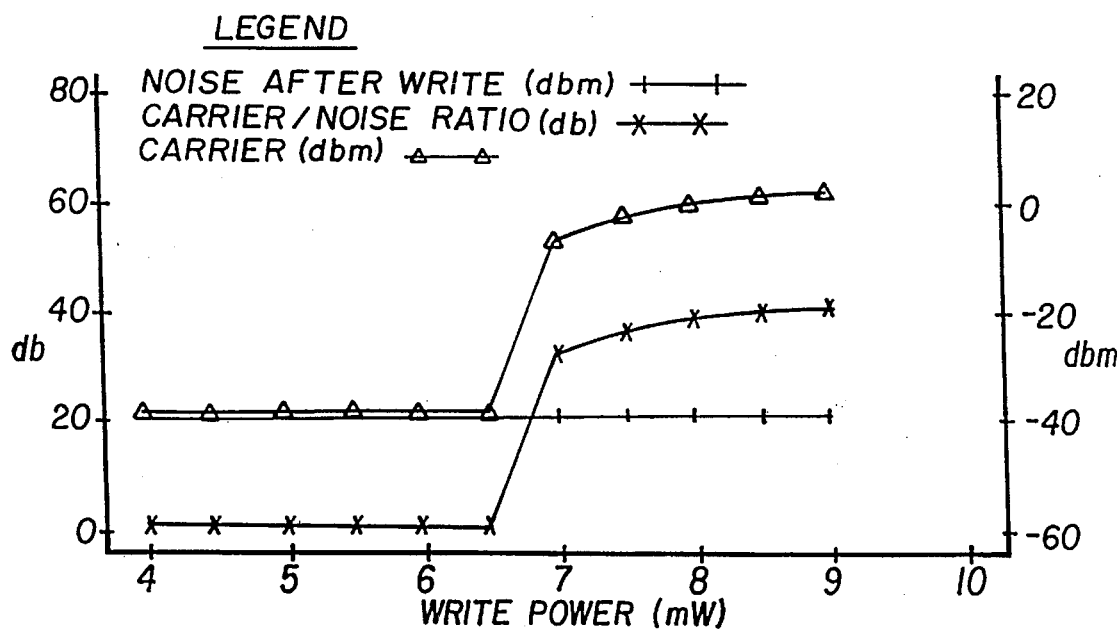
FIG. 7 is a plot showing the signal levels versus power levels for the first disk used in FIG. 6.
Figure 8:
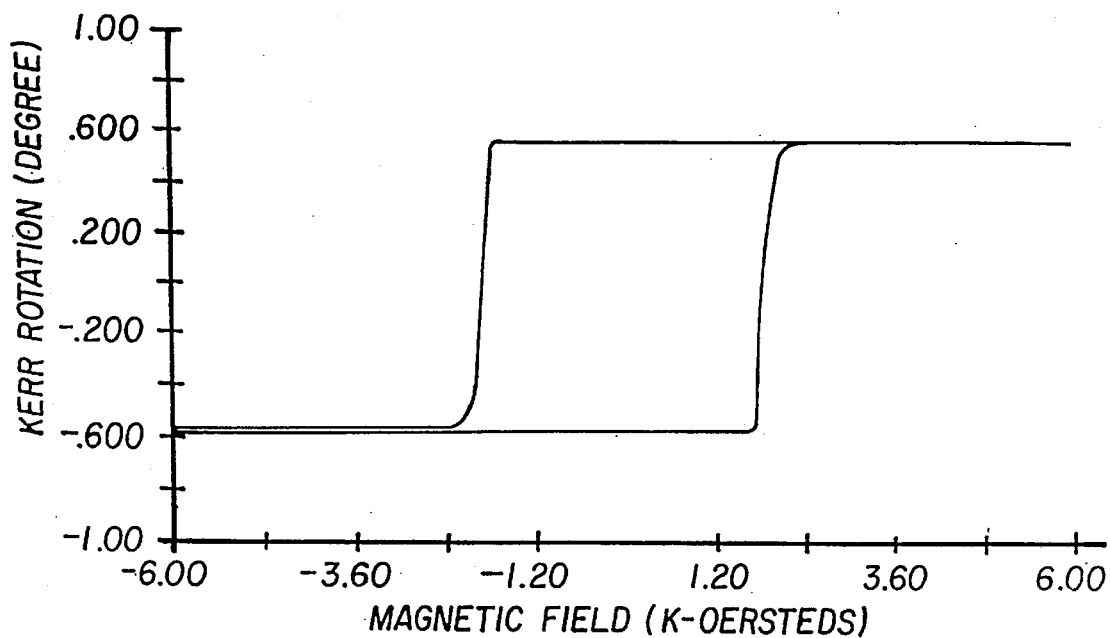
FIG. 8 is a Kerr hysteresis loop using amorphous zinc-tin-oxide seed layer for a second disk used in the comparison example.

Dynamic performance of a multilayer disk using a 80 nm crystalline ZnO is shown in FIG. 7. The disk has a carrier level =2.3 dBm, Noise level =−38.8 dBm, carrier to noise ratio −41.1 dB.

The second disk uses 10 nm amorphous $Zn_{.5}Sn_{.5}O_{1.5}$ seed layer of the present invention. Coercivity is 1874 Oe which is lower than that obtained using ZnO crystalline seed layer as Carcia has predicted. But the Kerr hysterisis loop (see FIG. 8) has much better squareness than the disk using crystalline ZnO. The dynamic test data shows that this improved squareness gives superior dynamic performance.

Figure 9:
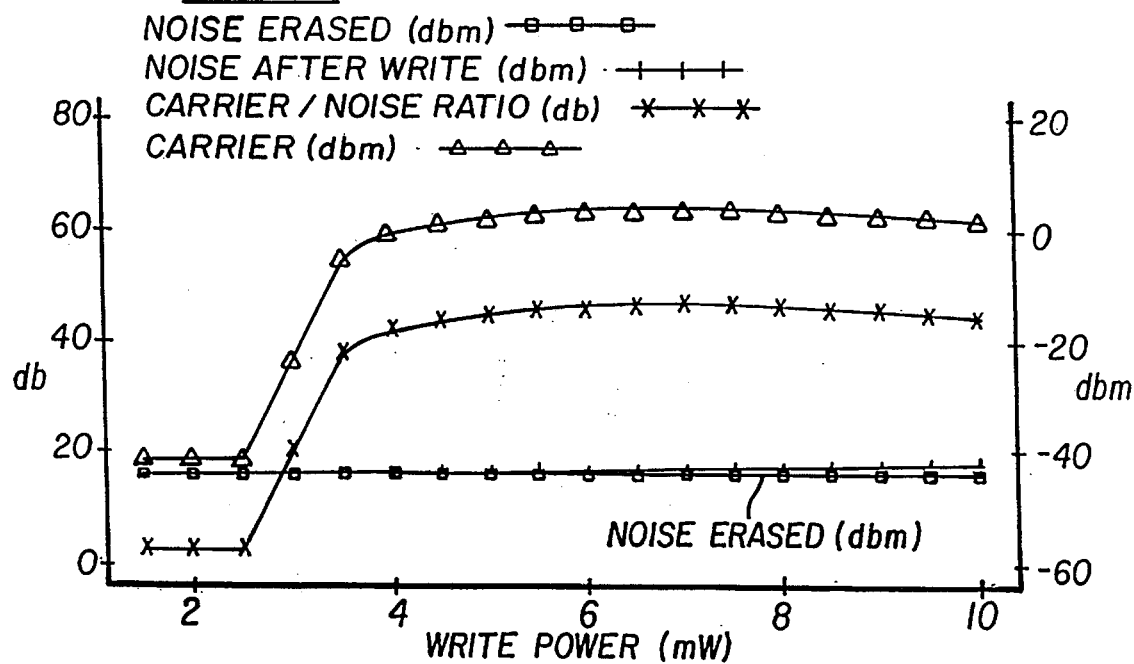
FIG. 9 is a plot showing the signal levels versus power levels for the second disk used in FIG. 8.

Dynamic performance of a multilayer disk using 10 nm amorphous $Zn_{.5}O_{1.5}$ seed layer of the present invention is shown in FIG. 9. The disk has a carrier level =3.6 dBm, Noise level——43.0 dBm, carrier to noise ratio −46.6 dB.

The two disks behave very differently. The first disk prepared using crystalline ZnO has higher coercivity but also has larger slantness (or low squareness of the Kerr hysterisis loop) and is very noise and low carrier to noise ratio. The second disk obtained using an amorphous ZnSnO seed layer has comparatively lower coercivity but higher squareness of the Kerr hysterisis loop; low noise and higher carrier to noise ratio. Thus Carcia has absolutely no recognition of the fact that there would be a significant and unexpected improvement in the squareness of the Kerr hysterisis loop and decrease in the writing noise when an amorphous seed layer is used.

The invention has been described in detail with particular reference to certain preferred embodiments thereof, but it will be understood that variations and modifications can be effected within the spirit and scope of the invention.

PARTS LIST 10 substrate
12 duplex seed layer
13 Pt layer
14 Co layer
15 multilayer recording element
18 lacquer overcoat layer
20 dielectric layer
22 metal layer

We claim:

1. A magnetooptical recording medium comprising a substrate, a seed layer structure having at least two layers including a first layer formed on the substrate and made of amorphous ITO or ZTO and having a thickness of 0.2–20 nm; and a metal layer formed directly on the first layer having a thickness of 0.2–3.2 nm and a recording multilayer of alternate layers of platinum and cobalt or palladium and cobalt alloy deposited onto the said seed layer structure, wherein the said seed layer structure is selected to improve the coercivity and squareness of the recording multilayer.

2. The magnetooptical recording medium of claim 1 further includes a UV curable lacquer overcoat provided over the recording multilayer.

3. The magnetooptical recording medium of claim 1 further including a dielectric layer on the recording multilayer and a second metal layer provided on the dielectric layer and a UV curable lacquer overcoat provided on the metal layer.

4. The magnetooptical recording medium of claim 1 wherein the metal layer is selected from the group consisting of Pt, Au, Pd and Zn.

5. The magnetooptical recording medium of claim 1 wherein the metal layer is Pt.

6. The magnetooptical recording medium of claim 1 wherein said multilayer film contains 5–25 bilayers of Co and Pt, the Co layers have a thickness of from 0.2 to 0.8 nm and the Pt layers have a thickness from 0.4 to 2 nm.

7. The magnetooptical recording medium of claim 5 wherein said multilayer film contains 5–25 bilayers of Co and Pt, the Co layers have a thickness of from 0.2 to 0.8 nm and the Pt layers have a thickness from 0.4 to 2 nm.

\* \* \* \* \*